Patented June 7, 1927.

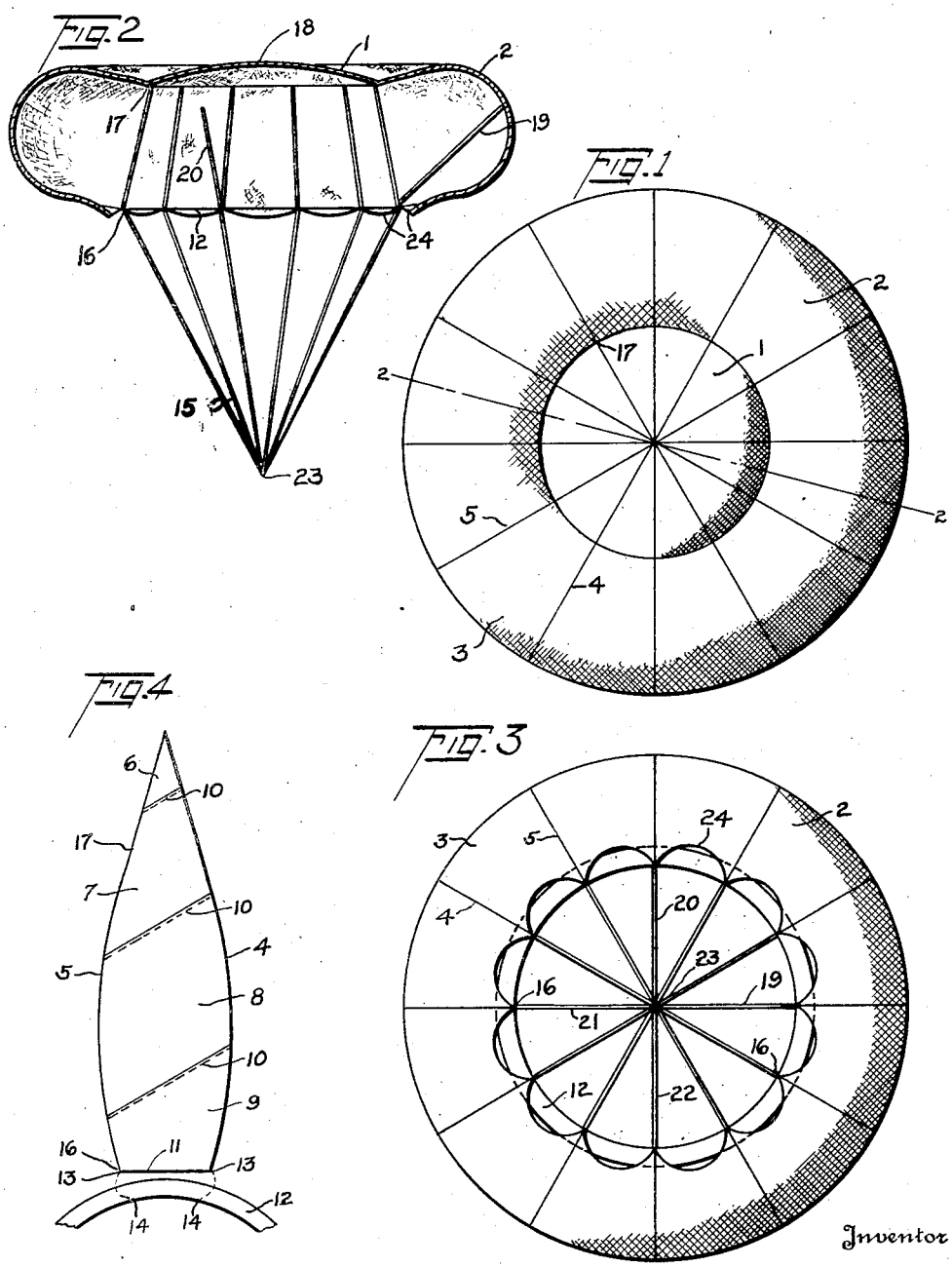

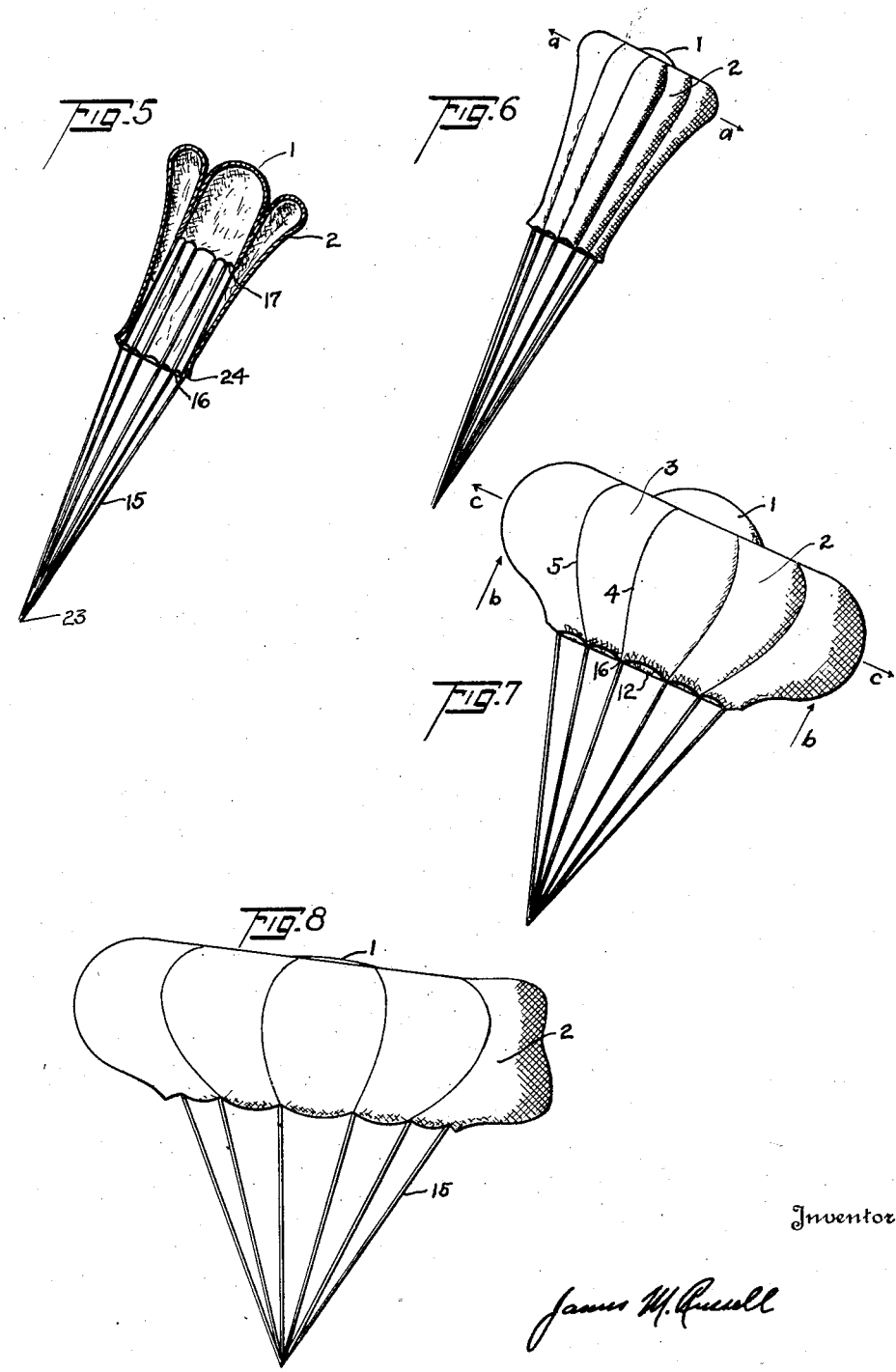

1,631,766

UNITED STATES PATENT OFFICE.

JAMES M. RUSSELL, OF SAN DIEGO, CALIFORNIA, ASSIGNOR TO HERBERT R. McCLINTOCK, OF SAN DIEGO, CALIFORNIA.

PARACHUTE.

Application filed February 17, 1926. Serial No. 88,851.

This invention relates to landing apparatus for aeronauts, and has for its object the provision of a parachute which will be positive in opening, shock absorbing at high speed, and which will make use of the sustaining surface in an efficient manner.

A further object is the provision of a parachute which will be exceedingly stable and which is provided with means for preventing or damping oscillation, and free from the objectionable breathing which is apparent in present day parachutes.

A further object is the provision of a parachute of this character which is provided with an outer rim or lobe, which is sensitive to differences in pressure, to prevent the instantaneous full opening of the parachute at exceedingly high speeds, but which will insure the full opening of the parachute as soon as the speed of falling has been decreased to such a value as desirable.

A further object of the invention is the provision of means by which the parachute may be controlled and the direction of descent governed manually without materially impairing the efficiency and without causing undue oscillation of the falling aeronaut.

A further object of the invention is the provision of scoops provided at the rim of the parachute so that they will catch air and guide the air into the parachute and insure its opening regardless of twists in the suspension elements.

In conventional parachutes of the present day construction the canopy assumes the shape of an inverted bowl. The lines being attached to the outer edge or periphery of the canopy pulls the periphery toward the center, causing a much smaller effective diameter by not allowing the periphery to extend itself as much as if the load were more evenly distributed over the entire canopy. This shape causes the parachute to be very unstable since it readily spills the air at its outer edge. It also has the objection of what is known as breathing, due to the alternate expansion to its limit, spilling the air at its outer edge, decreasing in diameter, increasing its speed and then expanding to its limit again and decreasing its speed, due to its greater diameter. These various steps take place successively and are exceedingly objectionable.

At very high speeds the vent or center hole in the canopy used in present day construction cannot be large enough to permit the parachute to open gradually as the air would exhaust at the vent as fast as it entered at the bottom. A small vent and strong construction cannot be used at high speeds since the fabric is not strong enough to sustain the shock of opening at high speeds, and the instantaneous decrease in speed which this causes.

Present day parachutes are quite difficult to steer and are slow to respond, and often start to oscillate as soon as an attempt at steering is made. Oscillation in descent is a very bad fault, often resulting in injury to the parachutist. This lateral and longitudinal instability also causes the parachute to descend at a much faster rate for a given diameter and a given amount of sustaining surface, than if the parachute were inherently stable.

This invention therefore has as its objects the correction of the various faults inherent in the present day construction. Various other objects and advantages of my invention will be more fully set forth in the following description and in the drawings, in which Fig. 1 is a plan view of the parachute open in the air.

Fig. 2 is a central vertical section on the line 2—2 of Fig. 1.

Fig. 3 is a bottom view of the open parachute.

Fig. 4 is a detailed view showing one of the panels of the canopy and its method of attachment to the bottom ring.

Fig. 5 is a central section through the parachute, as the parachute starts to open.

Fig. 6 is a side elevation of the parachute as it starts to open.

Fig. 7 is a side elevation showing the parachute about one-half open, and

Fig. 8 is a side elevation showing the parachute fully opened and showing the lobe at the right partially deflated to steer the parachute.

Referring more particularly to the drawings by reference numerals, the canopy or supporting surface of the parachute comprises the central upper surface 1 and the outer rim or lobe 2. The canopy is formed of a number of radially arranged panels 3 having a shape as shown in Fig. 4, these panels being attached together by means of seams along the lines 4 and 5.

Each panel is made up of a number of sections of suitable material indicated at 6, 7, 8 and 9, joined together along the seams 10, the material preferably arranged on the bias with the bias of the fabric in adjacent panels at an angle to maintain a taut construction.

The outer edges 11 of the various panels are attached to a band or ring 12 of flexible material, and a fullness is provided in the edges of the panels by attaching the points 13 of the panel to points 14 of the band, these points 14 being considerably closer together than the distance between the corners 13 of the panels. Scoops are thus provided by means of the fullness of the panel edges, which causes air to be induced into the parachute as will be more fully described.

The panels have a maximum width intermediate their ends so that the parachute has a tendency to assume the form shown in Fig. 2 when open.

Suspension cables 15 of any suitable number are attached in any desired manner at their lower ends 23 to the weight or load, or the suspension harness of the aeronaut. These cables 15 are attached at points 16 to the band or ring 12 and to the edges of the panel pieces. The cables then extend upwardly to points 17 where they enter the seams by which the panels are attached together. The suspension cables then extend down the seams to the central apex of the canopy 18. It will be noted from Figs. 2 and 4 that the distance between the points 16 and 17 along the panel seam is far greater than the distance of the suspension cables between the points 16 and 17, and the parachute is thus caused to assume the shape when fully opened as indicated in Fig. 2. The outer lobe 2 of the parachute, not being confined by the cable load, is bellied out by the air in a lateral direction, and the upper central portion 1 of the canopy assumes a slightly spherical shape, but this curvature is far flatter than the bowl shape assumed by parachutes constructed in accordance with prior designs.

Attached to the central portion of the lobe 2 at preferably four equidistant points around the outer portion of the parachute, are control cords 19, 20, 21 and 22. These control cords are not attached to the edges of the panels at the points 16, but extend down to the point 23, where they are controlled by the aviator.

Figs. 5 and 6 show the parachute starting to open at high speed. The scoops 24 provided by reason of the fullness in the edges of the panel pieces, and the form defining band 12, insure the admission of air into the interior of the parachute regardless of any twisting or entanglement of the shroud lines or cables 15. The band 12 is preferably made of fabric having more body than the sustaining canopy itself, and is circularly shaped as shown in the drawings to assume a flat position when the parachute is fully opened. The lobe 2 not being held by the lines is free to exert the maximum outward pull indicated by the arrows $a$, Fig. 6. In this position the lobe 2 is folded back against the side walls of the center portion 1. The external pressure acting upon the side of the lobe 2, is less than but comparable to the internal pressure, and consequently the external pressure tends to prevent a too rapid expansion of the lobe 2. This allows the gradual opening of the canopy. The lobe extends itself only as the speed is reduced by the drag of the canopy. The reduction in speed and consequent lessening of external pressure allows the internal pressure to force the canopy to a more extended position.

Fig. 7 shows the canopy about one-half open: the external pressure due to the rapid fall of the parachute exerting a force indicated by the arrows $b$; the scoops assuming a more horizontal position; the internal pressure forcing the lobe to extend itself radially in the direction of arrows $c$; the center portion 1 being furthered in its expansion by the lobe at slow speeds but held to some extent at high speeds.

As the speed decreases still further the parachute assumes the full open position indicated in Figs. 2 and 8. In this position the side area of the lobe is much greater than the bottom area of the lobe. The side wall area of the lobe thus has a resistance tending to hold it to center and the internal pressure tending to force the entire canopy to a full open position is of a certain force. These two forces are therefore balanced in any desired ratio to secure the proper slowness of opening at high speeds. This ratio may be varied in the construction of the parachute by varying the side wall area or vertical depth of the lobe by properly positioning the point of attachment 17 of the cables to the canopy.

Atmospheric disturbances tending to cause oscillation are automatically damped out in their inception as a result of the outer lobe of the canopy not being confined by the line load and governed by the pressure acting upon it. If, for example, the point 23 in Fig. 2 moves to the left, the lobe at the right of the parachute by reason of the vertical pressure of the external air exerts the back drag upon the suspension lines and lags behind in its movement to follow the movement of point 23. Point 23 in its return to the right has the back drag of the lobe at the left of the figure which is increased by the effect of the lobe at the right which has then started to move to follow the movements of point 23. The vertical pressure upon the under surface of the lobe, together with the drag upon its upper surface, causes the lobe to assume the dihedral angle as shown. This angle, together with the tendency of the lobe to lag in oscillation permits of a steady descent, the circular lobe acting as a stabilizer to the center portion of the load sustaining canopy. The internal pressure acting upon the lobe causes the center portion 1 of the canopy to flatten out, and the lobe not being held towards the center by the line load, reaches its maximum horizontal diameter. The result is a very efficient parachute, as the open diameter of effective area of this parachute is slightly more than the present day construction, while my parachute provides a top drag considerably in excess of that found in present day construction. For the same amount of fabric as used in conventional types of parachutes, but with far less shroud line, a far more efficient and stable parachute may be constructed with my invention than those hitherto made.

The canopy is not tilted directly by the parachutist, but through a slight effort on his part in pulling upon the various control cords 19, 20, 21 or 22, he collapses a portion of the lobe to spill the air from it. The pull upon the control cords is in a generally inward direction and the collapsing of a portion of the lobe is aided by the vertical upward pressure upon the under and outer surface of the lobe. The parachutist has merely to overcome the pressure acting upon the portion of the lobe which is collapsing and not the entire canopy. As the result of the collapsing of the right hand portion of the lobe 2, see Fig. 8, the right hand portion of the canopy has less resistance and the entire canopy tilts as shown, due to the unequal pressure distribution.

It is to be understood that the construction shown in the accompanying drawings can be varied to some extent without departing from the spirit or scope of this invention, it being the purpose of this disclosure to generally depict one method of construction for purposes of illustration.

I claim:

1. A parachute having an upper supporting surface and an outer continuation for said surface extending downwardly and inwardly therefrom, and means to directly interconnect the upper and lower portions of said continuation.

2. A parachute having an upper supporting surface which is generally flat and a downwardly and inwardly curved continuation therefor forming substantially a lower surface spaced below the said upper surface when in operation, and means for maintaining the shape of said continuation so that it extends downwardly and inwardly from said upper supporting surface.

3. A parachute having an upper central load sustaining surface, and an outer portion curving downwardly and inwardly from said surface, and means for normally maintaining said outer portion curving downwardly and inwardly from said load sustaining surface so as to form a peripheral lobed deformable rim sensitive to differences in pressure within and without the said outer portion to determine its shape.

4. A parachute canopy having a central load sustaining portion and outer peripheral portion, and load sustaining lines attached to said central portion and extending downwardly and attached to the edge of the peripheral portion, the distance along the parachute canopy along radial lines between the said points of attachment being much greater than the length of the said load sustaining lines between said points of attachment.

5. A parachute having an upper supporting surface and an outer continuation for said surface extending downwardly and inwardly therefrom and means in said outer continuation to induce air to enter said outer continuation.

6. A parachute comprising a fabric load sustaining portion, and an outer fabric lobe for inherently and automatically maintaining stability in descent, and means for normally maintaining the shape of the lower part of said lobe so that it curves inwardly and downwardly to a substantial degree when in operation.

7. In a parachute, in combination, a central load sustaining fabric portion, load supporting lines attached thereto, a peripheral portion, and means to manually control said peripheral portion between the sustaining fabric portion and the outer rim to control the parachute.

8. A parachute comprising a canopy and suspension elements attached to the canopy at the rim and at points inwardly removed from the rim portion, the length of the suspension element between said points of attachment being substantially less than the length of the canopy between said points so as to provide a downwardly and inwardly extending rim portion.

9. A parachute having a canopy formed of radial fabric sections shaped to provide a downwardly and inwardly extending rim portion, the rim edge of each section having substantially less width than the maximum width thereof.

10. A parachute comprising a central load sustaining portion and a downwardly and inwardly extending rim portion, and a series of load suspension elements attached to the edge of the rim portion and extending substantially vertically from the said edge to the central load sustaining portion to provide an outer lobe in the parachute between the points of attachment of the load suspension elements.

11. A parachute comprising a central load sustaining portion and a downwardly and inwardly extending rim portion, and a series of load suspension elements attached to the edge of the rim portion and extending substantially vertically to the central load sustaining portion to provide an outer lobe in the parachute between the points of attachment of the load suspension elements, and means for deflating a portion of the lobe to spill the air from said portion.

12. A parachute comprising a central load sustaining portion and a downwardly and inwardly extending rim portion, and a series of load suspension elements attached to the edge of the rim portion and extending substantially vertically to the central load sustaining portion to provide an outer lobe in the parachute between the points of attachment of the load suspension elements, and a series of control cords extending downwardly to the load and attached to outer portions of the lobe between the said points of attachment.

13. A parachute comprising a continuous central load sustaining portion and a downwardly and inwardly extending rim portion, and a series of load suspension elements attached to the edge of the rim portion and extending substantially vertically to the central load sustaining portion to provide an outer lobe in the parachute between the points of attachment of the load suspension elements, and a band of material to which the edge of the rim portion is attached to define an opening in the bottom of the parachute, of a diameter substantially less than the maximum diameter of the parachute.

14. A parachute comprising a continuous central load sustaining portion and a downwardly and inwardly extending rim portion, and a series of load suspension elements attached to the edge of the rim portion and extending substantially vertically to the central load sustaining portion to provide an outer lobe in the parachute between the points of attachment of the load suspension elements, and a band of material to which the edge of the rim portion is attached to define an opening in the bottom of the parachute, of a diameter substantially less than the maximum diameter of the parachute, said rim portion being attached to said band so that a fullness is provided in the rim portion at the point of attachment.

15. A parachute comprising a central load sustaining portion and a downwardly and inwardly extending rim portion, and a series of load suspension elements attached to the edge of the rim portion and extending substantially vertically to the central load sustaining portion to provide an outer lobe in the parachute between the points of attachment of the load suspension elements, and means at the rim portion to induce air to enter the parachute.

16. A parachute comprising a series of radial panels attached together by radial seams to provide a central load sustaining portion and a downwardly and inwardly extending rim portion, a series of suspension cables attached at the edge of the panels at the seams and extending upwardly to the central load sustaining portion to provide an outer lobe in the parachute, an annular reinforcing ring to which the edges of the panels are attached of a diameter substantially less than the maximum diameter of the parachute, said panels being attached to said ring with a fulness in the edges of the panels to cause air to enter the lobe and open the parachute, and a series of control cords attached to intermediate portions of the lobe to permit the manual control of the path of descent.

In testimony whereof I have hereunto set my hand this 8th day of February, 1926.

JAMES M. RUSSELL.